United States Patent Office 2,841,594
Patented July 1, 1958

2,841,594

PRODUCTION OF BETA-FUROIC ACIDS

Richard Norman Lacey, Hull, England, assignor to British Industrial Solvents Limited, London, England, a British company No Drawing. Application June 6, 1952
Serial No. 292,193

5 Claims. (Cl. 260—347.3)

This invention relates to the production of beta-furoic acids by the rearrangement of gamma-lactones.

Various syntheses of beta-furoic acids are known, but they either suffer from the disadvantage that they utilize starting materials which are not easily accessible or from the disadvantage that only the methyl derivatives can be obtained from easily accessible compounds. An object of the present invention is to provide a relatively simple synthesis of many beta-furoic acids from easily accessible starting materials.

According to the present invention the process for the production of beta-furoic acids comprises heating an unsaturated gamma-lactone as hereinafter defined at an elevated temperature with a strong acidic catalyst.

The unsaturated gamma-lactones which may be reacted according to the process of the present invention have the following structural formula:

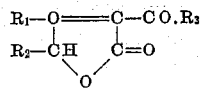

where $R_1$, $R_2$ and $R_3$ represent aryl, alkyl or aralkyl groups. The precise nature of the $R_1$, $R_2$ and $R_3$ groups may vary widely without affecting the reaction according to the present invention. Thus, suitable alkyl groups are the methyl, ethyl, propyl, butyl, amyl, hexyl, heptyl, octyl, nonyl, decyl, hendecyl, lauryl and stearyl groups; suitable aryl groups are the phenyl, methylphenyl, nitrophenyl, chlorophenyl, dimethyl phenyl, ethyl phenyl and nitromethylphenyl groups. By aralkyl group we mean a radical in which an aryl group is substituted for a hydrogen atom of an alkyl group, for example the benzyl, phenylethyl and phenylpropyl groups. These lactones are easily accessible since they may be prepared by the cyclisation of the acetoacetic acid esters of the appropriate 1:2-hydroxy carbonyl compounds or by the interaction of the appropriate beta-keto ester with the appropriate 1:2 hydroxy-carbonyl compound.

The process of the present invention results in a molecular rearrangement in which the atoms of the unsaturated lactones rearrange themselves to form the corresponding beta-furoic acids having the following structural formula:

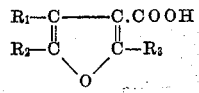

The molecular weight of the product is the same as that of the starting material.

The process of the present invention may be carried out within a wide temperature range which is limited at the lower end by the fact that the speed of the rearrangement decreases with decreasing temperature. The upper limit of the temperature range is controlled by the stability of the furoic acid produced and the need to avoid the decomposition of the lactone to give unwanted by-products. The reaction may be carried out at temperatures lying between room temperature (20–30° C.) and 200° C. and it is particularly advantageous and convenient to carry out the process at about 100° C. by immersing the vessel containing the reaction mixture in a boiling water bath.

In the process of the present invention it is often convenient to dissolve or disperse the lactone in an organic diluent which thereby facilitates the handling of the reaction mixture and enables the re-arrangement to be carried smoothly to completion. The organic diluent must not react with the lactone or with the formed furoic acid or with the acidic catalyst under the conditions in the reaction mixture. For this reason it is preferred not to use alcohols as diluent as they tend to form esters with the furoic acids. It is preferred that the diluent should be a solvent for the lactone and the acidic catalyst. Weak organic acids, hydrocarbons, halogenated hydrocarbons and ethers such as acetic acid, dichlorethane and dioxane are examples of diluents which may be used when carrying out the re-arrangement. If so desired the temperature of the reaction may be controlled by choosing a suitable diluent and carrying out the reaction under reflux of the diluent.

The re-arrangement is brought about and catalysed by the presence in the reaction mixture of a strong acidic catalyst, preferably a strong mineral acid such as hydrochloric acid, sulphuric acid, phosphoric acid and the like. Hydrochloric acid is particularly effective, and therefore its use is preferred. The acid catalyst may also be of the type which has been used to bring about the Friedel-Crafts reaction and will hereinafter be referred to as a Friedel-Crafts halide catalyst.

As Friedel-Crafts halide catalysts, aluminium chloride and boron fluoride are preferred, although it is also possible to use aluminium bromide, $AlBr_2Cl$, $AlCl_2Br$, $Al_2Br_5Cl$, $TiCl_4$, $TiCl_4$—$AlCl_3$, $TiCl_4$—$Al(OC_2H_5)_3$, $AlCl_3 \cdot AlCl_2OH$, $AlBr_3 \cdot AlBr_2OH$, $AlBr_2Cl \cdot AlOCl$, $AlBrCl_2.AlOBr$, $TiCl_4.AlCl_2OH$, $TiOCl_2.TiCl_4$, $AlBr_3.Br_2.CS_2$, $AlBr_3.Br_4.CS_2$, $BF_3$-isopropyl alcohol complex, or $AlCl_3$-isoprene complex.

The beta-furoic acids of the present invention may be recovered from the reaction mixture by any known means such as for instance by crystallisation or solvent extraction procedures. Most of the beta-furoic acids are not very soluble in water and, consequently, may be recovered from the reaction mixture by diluting it with water whereby the beta-furoic acid is precipitated.

The following examples illustrate specific methods of carrying the invention into effect: the expressions "parts by weight" (P. B. W.) and "parts by volume" (P. B. V.) bear the same relationship to each other as do grams to cubic centimetres.

EXAMPLE 1

3 parts by weight of the lactone of 4-methyl hex-3-en-5-ol-2-on-3-carboxylic acid in 30 parts by volume of acetic acid were heated at 100° C. with 15 parts by volume of concentrated hydrochloric acid for half an hour. On pouring the product into water 2.5 parts by weight of a crystalline precipitate of 2:4:5-trimethylfuran-3-carboxylic acid were obtained. This precipitate was recrystallised from aqueous methanol to give prisms M. P. 130–131° C.

EXAMPLE 2

To 5 parts by weight of the lactone of 4-propyloct-3-en-5-ol-2-on-3-carboxylic acid in 30 parts by volume of acetic acid was added 15 parts by volume of concentrated hydrochloric acid and the mixture was then heated for one hour. Water was then added to the reaction mixture giving an oil which crystallised on standing. The product was dried in a vacuum desiccator to yield 4.8 parts by weight of 4:5-dipropyl-2-methylfuran-3-carboxylic acid and was crystallised from aqueous methanol to yield crystals with a melting point of 61° C.

EXAMPLE 3

50 parts by weight of the oily lactone of 4-hendecyl-hexadec-3-en-5-ol-2-on-3-carboxylic acid was heated at 100° C. with 100 parts by volume of acetic acid and 20 parts by volume of concentrated hydrochloric acid for 2 hours. Since complete solution of the oil was not obtained the mixture was agitated. The product was poured into water and extracted with ether to give an oil which partly solidified. Washing with dichloroethane gave 5 parts by weight of a solid, M. P. 72–73° C. and crystallisation from dichloroethane gave pure 4:5-dihendecyl-2-methylfuran-3-carboxylic acid as colourless microcrystals, M. P. 74° C.

EXAMPLE 4

The rearrangement of the lactone of 4-ethyl-hept-3-en-5-ol-2-on-3-carboxylic acid to give 4:5-diethyl-2-methyl-furan-3-carboxylic acid was carried out by dissolving the lactone in a suitable solvent and heating with various strong acidic catalysts at 95–100° C. as shown in Table 1 below: 1 part by weight of lactone was taken for each experiment.

*Table 1*

| Parts by volume of Solvent | Parts by volume of Catalyst | | Time, Hr. | Product, parts by weight |
|---|---|---|---|---|
| 10 | acetic acid | 5 conc.HCl | 0.5 | 0.79 |
| 10 | do | 5 conc.HCl | 1.0 | 0.73 |
| 10 | do | 1 conc.HCl | 1.0 | 0.80 |
| 10 | dioxan | 5 conc.HCl | 1.0 | 0.77 |
| 10 | acetic acid | 0.1 conc.$H_2SO_4$ | 1.0 | 0.57 |
| 10 | do | 1 boron trifluoride etherate | 1.0 | 0.675 |
| 10 | do | 1 p.b.w. anhydrous aluminum trichloride | 1.0 | 0.34 |

Crystallisation of these products from aqueous methanol gave the pure furoic acid as colourless prisms, M. P. 105–106° C.

EXAMPLE 5

5 parts by weight of the lactone of 4:5-diphenylpent-3-en-5-ol-2-on-3-carboxylic acid was heated in 50 parts by volume of acetic acid with 5 parts by volume of concentrated hydrochloric acid in a bath at 100° C. After a few minutes the mixture boiled and a crystalline solid was deposited. The product was heated for an hour in all and cooled to give 3.2 parts by weight of solid 4:5-diphenyl-2-methyl-furan-3-carboxylic acid in the form of colourless plates, M. P. 208° C. The addition of water gave a further crop of 1.4 parts by weight of a somewhat crude product. Crystallisation from ethyl acetate gave the pure acid, M. P. 212° C. The results obtained in the preparation of 4:5-diphenyl-2-methyl-furan-3-carboxylic acid under different conditions are set forth in Table 2.

EXAMPLE 6

2 parts by weight of the lactone of 1-benzoyl-2:3-diphenylprop-1-en-3-ol-1-carboxylic acid were heated for 90 minutes at 100° C. with a mixture of 10 parts by volume of acetic acid and 2 parts by volume of concentrated hydrochloric acid. Water was added and the solid precipitate, on re-crystallisation from acetic acid gave 1.7 parts by weight of 2:4:5-triphenyl-furan-3-carboxylic acid M. P. 257° C.

The beta-furoic acids produced according to the present invention form a useful series of chemical compounds. They may be hydrogenated with hydrogen in the presence of a suitable hydrogenation catalyst to give the corresponding tetrahydro-compound or the heterocyclic ring may be opened by hydrolysis to yield corresponding aliphatic compounds. Decarboxylation under the influence of heat gives substituted furans which may be hydrolysed by acids to give substituted 1:4 diketones of the formula $(R_2)CO.CH(R_1).CH_2.CO(R_3)$. Beta-furoic acid itself occurs naturally in plants.

I claim:

1. A process for the production of a beta-furoic acid which comprises heating an unsaturated lactone at an elevated temperature in the presence of a strong acidic catalyst selected from the group consisting of strong mineral acids and Friedel-Crafts halide catalysts, said lactone having the structural formula

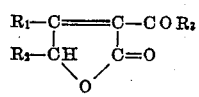

where $R_1$, $R_2$ and $R_3$ are members of the group consisting of alkyl, phenyl, and alkyl-substituted phenyl groups.

2. A process according to claim 1, wherein the lactone is heated to a temperature between room temperature and 200° C.

3. A process according to claim 1, wherein the lactone is diluted with a liquid organic diluent selected from the group consisting of organic acids, hydrocarbons, halogenated hydrocarbons and ethers.

4. A process according to claim 3, wherein the reaction mixture is heated to the boiling point of said diluent.

5. A process according to claim 1 wherein the strong acidic catalyst employed is hydrochloric acid.

*Table 2*

| Lactone, parts by weight | Parts by volume of Solvent | Parts by volume of Catalyst | | Temp., °C. | Time in hrs. | Yield, percent | M. P., °C. |
|---|---|---|---|---|---|---|---|
| 10 | 50 acetic acid | 10 | conc.HCl | 100 | 1 | 80 | 208 |
| 10 | 50 do | 10 | conc.HCl | 100 | 0.33 | 76 | 208 |
| 5 | 25 do | 0.2 | conc.HCl | 100 | 1.5 | 24 | 204 |
| 5 | 25 dichlorethane | 0.2 | conc.$H_2SO_4$ | 83.5 | 1.5 | 30 | 208 |

References Cited in the file of this patent

Beilstein, vol. 18, 4th edition, page 293 (1034), citing Plancher, Albini—Atti della Reale Accademia die Lincei (Rendiconti), [5] 13 I, 42.

Beilstein, vol. 3, 4th edition, page 737 (1921), citing Plancher, Albini—Atti della Reale Accademia die Lincei (Rendiconti), [5] 13 I, 42.

Knorr: Annalen, vol. 303, p. 144 (1898).

Beilstein, vol. XVII, 1st supplement, pp. 513–514 (1934).

Beilstein, vol. XVII, pp. 513–514 (1933).

UNITED STATES PATENT OFFICE
Certificate of Correction

Patent No. 2,841,594                                        July 1, 1958

Richard Norman Lacey

It is hereby certified that error appears in the above numbered patent requiring correction and that the said Letters Patent should read as corrected below.

Column 1, lines 32 to 35, the formula should appear as shown below instead of as in the patent—

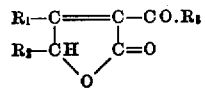

Signed and sealed this 4th day of November 1958.

[SEAL]

Attest:
KARL H. AXLINE,
*Attesting Officer.*

ROBERT C. WATSON,
*Commissioner of Patents.*